United States Patent
Tung et al.

(10) Patent No.: US 10,026,149 B2
(45) Date of Patent: Jul. 17, 2018

(54) IMAGE PROCESSING SYSTEM AND IMAGE PROCESSING METHOD

(71) Applicant: MStar Semiconductor, Inc., Hsinchu Hsien (TW)

(72) Inventors: Yi-Shin Tung, Zhubei (TW); Chia-Chiang Ho, Zhubei (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 120 days.

(21) Appl. No.: 15/208,799

(22) Filed: Jul. 13, 2016

(65) Prior Publication Data
US 2017/0061573 A1 Mar. 2, 2017

(30) Foreign Application Priority Data
Aug. 24, 2015 (TW) .............................. 104127478 A (51) Int. Cl.
G06T 1/60 (2006.01)
G09G 5/39 (2006.01)
H04N 19/176 (2014.01)
H04N 19/426 (2014.01)
H04N 19/115 (2014.01)
H04N 19/40 (2014.01)

(52) U.S. Cl.
CPC ............... *G06T 1/60* (2013.01); *G09G 5/39* (2013.01); *H04N 19/115* (2014.11); *H04N 19/176* (2014.11); *H04N 19/426* (2014.11); G09G 2340/02 (2013.01); G09G 2350/00 (2013.01); G09G 2360/122 (2013.01); H04N 19/40 (2014.11)

(58) Field of Classification Search
CPC ......... G06T 1/60; G09G 5/39; G09G 2340/02
USPC ................................ 345/543, 544, 545, 555
See application file for complete search history.

(56) References Cited

U.S. PATENT DOCUMENTS 9,767,529 B1 * 9/2017 Liu ........................... G06T 1/60

FOREIGN PATENT DOCUMENTS

TW 201233189 A 8/2012
TW 201318436 A 5/2013

OTHER PUBLICATIONS

TIPO Office Action, dated Aug. 18, 2016, 6 pages.

* cited by examiner

*Primary Examiner* — Jacinta M Crawford
(74) *Attorney, Agent, or Firm* — Edell, Shapiro & Finnan, LLC (57) ABSTRACT

An image processing system includes an image processing module, a frame buffer encoding module and a frame buffer. Each image block includes multiple first-type coding blocks and at least one second-type coding block. The image processing module generates a first image processed result according to multiple first-type coding blocks of a target image block. The frame buffer encoding module generates a first frame buffer encoded result according to the first image processed result. The frame buffer, for the target image block, provides a buffer region including at least one first random access point and a second buffer region including at least one second random access point. The first frame buffer encoded result is stored to the first buffer region. At least one second-type coding block of the target image block is stored to the second buffer region.

18 Claims, 12 Drawing Sheets

IMAGE PROCESSING SYSTEM AND IMAGE PROCESSING METHOD

This application claims the benefit of Taiwan application Serial No. 104127478, filed Aug. 24, 2015, the subject matter of which is incorporated herein by reference.

BACKGROUND OF THE INVENTION

Field of the Invention

The invention relates in general to an image processing technology, and more particularly to a frame buffer for storing image data.

Description of the Related Art

With the thriving development of various kinds of digital electronic products, most current audiovisual multimedia data exists in a digital format. Digital files of audiovisual data are usually quite large, and the amount of data increases as the resolution gets higher. For example, in applications of video phone calls or digital televisions, the audiovisual data is usually transmitted by streaming via a wireless network. Due huge amounts of data, an issue of insufficient transmission bandwidth may occur. Thus, a transmitter first encodes the audiovisual data by digital audiovisual coding technologies before transmitting the audiovisual data. MPEG-4 and H.264 are some current common digital audiovisual coding technologies.

After a receiver receives encoded audiovisual data, a decoder decodes and restores the received data to the audiovisual data that the transmitter transmits. In many receivers, a double data rate synchronous dynamic random access memory (DDR DRAM) is used as a buffer for buffering the restored audiovisual data for the use of subsequent image processing.

Decoded audiovisual data includes multiple video frames stored in a frame buffer. Each video frame is defined to have multiple image blocks, and each image block serves as a unit by which the video frame is access for subsequent image processing. For example, the video frame in FIG. 1(A) includes an image block (0, 0) to an image block (M, N), with the size of the image blocks being constant.

However, the space of the frame buffer used is also large as a result of an extremely large amount of audiovisual data. On the other hand, when image processing is performed, in order to increase the speed of accessing the audiovisual data from the frame buffer, a memory having a larger bandwidth and also being more costly is required. Thus, the overall costs of the hardware system is increased.

SUMMARY OF THE INVENTION

The invention is directed to a video frame buffer and a dynamic video processing system.

According to an embodiment of the present invention, an image processing system for performing image processing on multiple image blocks is provided. Each of the multiple image blocks includes a plurality of first-type coding blocks and at least one second-type coding block. The image processing system includes an image processing module, a frame buffer encoding module, a frame buffer and a frame buffer controller. The image processing module performs image processing on a plurality of first-type coding blocks of a target image block to generate a group of first image processed results. The frame buffer encoding module performs frame buffer encoding on the group of first image processed results to generate a group of first frame buffer encoded results. The frame buffer includes a first buffer region and a second buffer region corresponding to the target image block. The first buffer region includes at least one first random access point. The second buffer region includes at least one second random access point, which is independent from the at least one first random access point. The frame buffer controller controls the group of first frame buffer encoded results to be stored to the first buffer region of the frame buffer, and controls the at least one second-type coding block of the target image block to be stored to the second buffer region of the frame buffer.

According to another embodiment of the present invention, an image processing method, coordinating with a frame buffer to perform image processing on multiple image blocks, is provided. Each of the multiple image blocks includes a plurality of first-type coding blocks and at least one second-type coding block. The frame buffer includes a first buffer region and a second buffer region corresponding to the target image block. The first buffer region includes at least one first random access point. The second buffer region includes at least one second random access point, which is independent from the at least one first random access point. Image processing is first performed on a plurality of first-type coding blocks of the target image block to generate a group of first image processed results. Frame buffer encoding is performed on the group of first image processed results to generate a group of first frame buffer encoded result. The group of first frame buffer encoded results are stored to the first buffer region of the frame buffer, and the at least one second-type coding block of the target image block is stored to the second buffer region of the frame buffer.

The above and other aspects of the invention will become better understood with regard to the following detailed description of the preferred but non-limiting embodiments. The following description is made with reference to the accompanying drawings.

It should be noted that, the drawings of the present invention include functional block diagrams of multiple functional modules related to one another. These drawings are not detailed circuit diagrams, and connection lines therein are for indicating signal flows only. The interactions between the functional elements/or processes are not necessarily achieved through direct electrical connections. Further, functions of the individual elements are not necessarily distributed as depicted in the drawings, and separate blocks are not necessarily implemented by separate electronic elements.

DETAILED DESCRIPTION OF THE INVENTION

Figure 1A:
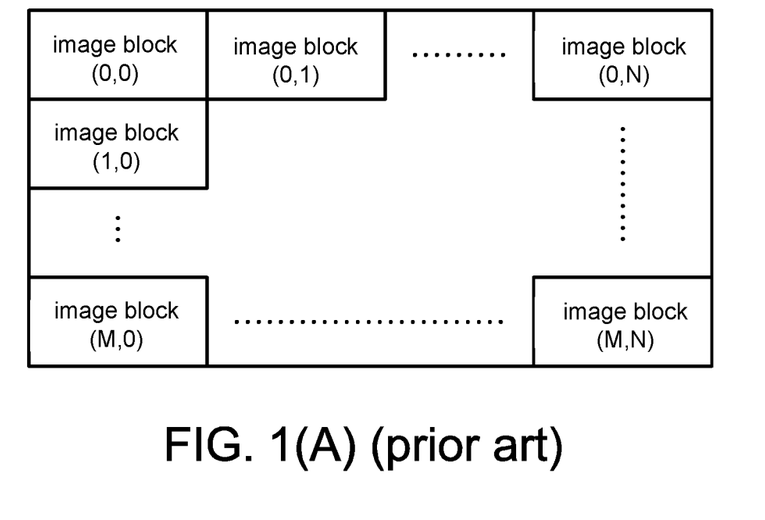
FIG. 1(A) is a schematic diagram of an image divided into multiple image blocks.
Figure 1B:
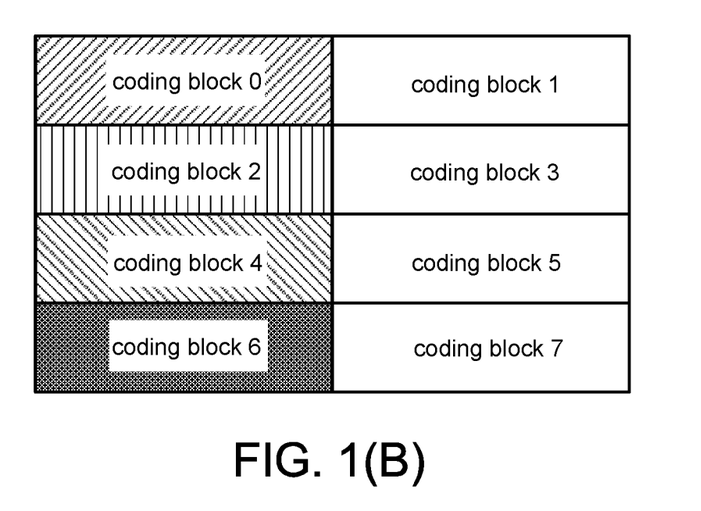
FIG. 1(B) is a schematic diagram of an image block divided into multiple coding blocks.
Figure 2A:
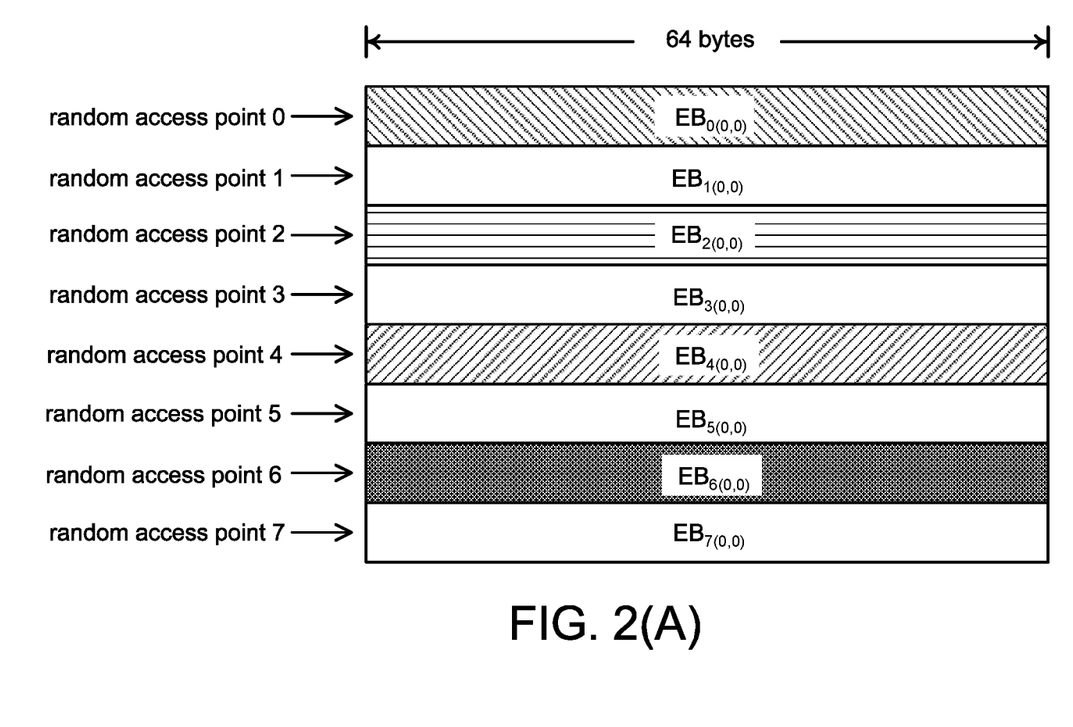
FIG. 2(A) shows a planning method of a storage space in a typical frame buffer.

According to an embodiment of the present invention, each image block is further defined into multiple coding blocks; for example, the image block (0, 0) in FIG. 1(B) is further defined into a coding block 0 to a coding block 7. In the embodiment, the coding block is a smallest unit for accessing a video frame. FIG. 2(A) shows that an image block is stored in a unit of coding blocks in a frame buffer. The data amount of each of the coding blocks is 64 bytes, for example, to present a planning method of a storage space in the frame buffer. In this example, each of eight coding blocks 0 to 7 (denoted as $EB_{0\ (0,\ 0)}$, $EB_{1\ (0,\ 0)}$, ... and $EB_{7\ (0,\ 0)}$, collectively referred to as $[EB_0 \sim EB_7]_{(0,\ 0)}$) is stored in a memory space having a length of 64 bytes.

Figure 3A:
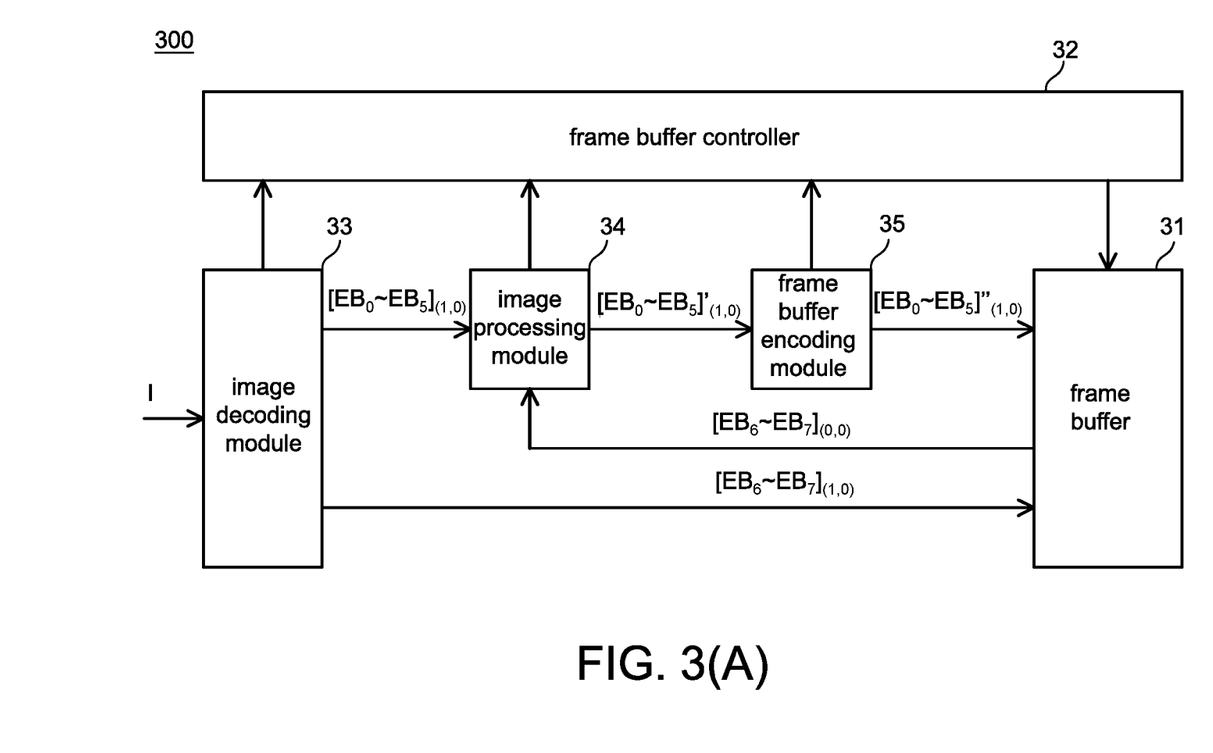
FIG. 3(A) to FIG. 3(C) are function block diagrams of an image processing system according to an embodiment of the present invention.

FIG. 3(A) shows a function block diagram of an image processing system 300 according to an embodiment of the present invention. The image processing system 300 includes a frame buffer 31, a frame buffer controller 32, an image decoding module 33, an image processing module 34 and a frame buffer module 35. The image processing system 300 performs image processing on multiple image blocks, e.g., the image block (0, 0) to the image block (M, N) in FIG. 1(A). In the description below, the division method of the image block in FIG. 1(A) is taken as an example. Based on the description below, one person skill in the art can understand that the scope of the present invention is not limited to the above division method.

Also refer to the structure of the image block in FIG. 2(A) with the image processing system 300 in FIG. 3(A). When performing image processing, a common situation is that, as the coding blocks 6 and 7 of the image block (0, 0) are adjacent to the image block (1, 0) in an original image, to perform image processing in the image processing module 34 for a target image block to be processed, i.e., the image block (1, 0), the image block (0, 0) is used as a reference image block. More specifically, data of the coding blocks 6 and 7 of the reference image block (0, 0) is referred. Assuming that the image block (0, 0) is earlier stored into the frame buffer 31, when the image processing module 34 performs image processing on the image block (1, 0), e.g., performing a deblocking process, the frame buffer controller 32 reads the data of the coding blocks 6 and 7 of the image block (0, 0) according to a request of the image processing module 34 from the image processing module 34. In one embodiment, to achieve an object of reading a part of coding blocks instead of the entire image block, eight memory spaces for storing the coding blocks 0 to 7 of the image block (0, 0) are respectively assigned with random access points, as the random access points 0 to 7 in FIG. 2(A). Thus, according to the request of the image processing module 34, the frame buffer controller 32 may directly access any coding block of the image block (0, 0) from the frame buffer 31 instead of read from starting point of the coding blocks located at previous addresses.

As shown in FIG. 3(A), in one embodiment of the present invention, the decoded audiovisual data is frame buffer encoded by the frame buffer encoding module 35 before being stored to the frame buffer 31. The frame buffer encoded audiovisual data is then stored to the frame buffer 31, so that the transmission bandwidth for accessing the audiovisual data from the frame buffer 31 can be saved. In the application, the term "frame buffer encoding" may be referred to a compression approach, which is not limited by the present invention, nor it limits the scope of the present invention.

Figure 2B:
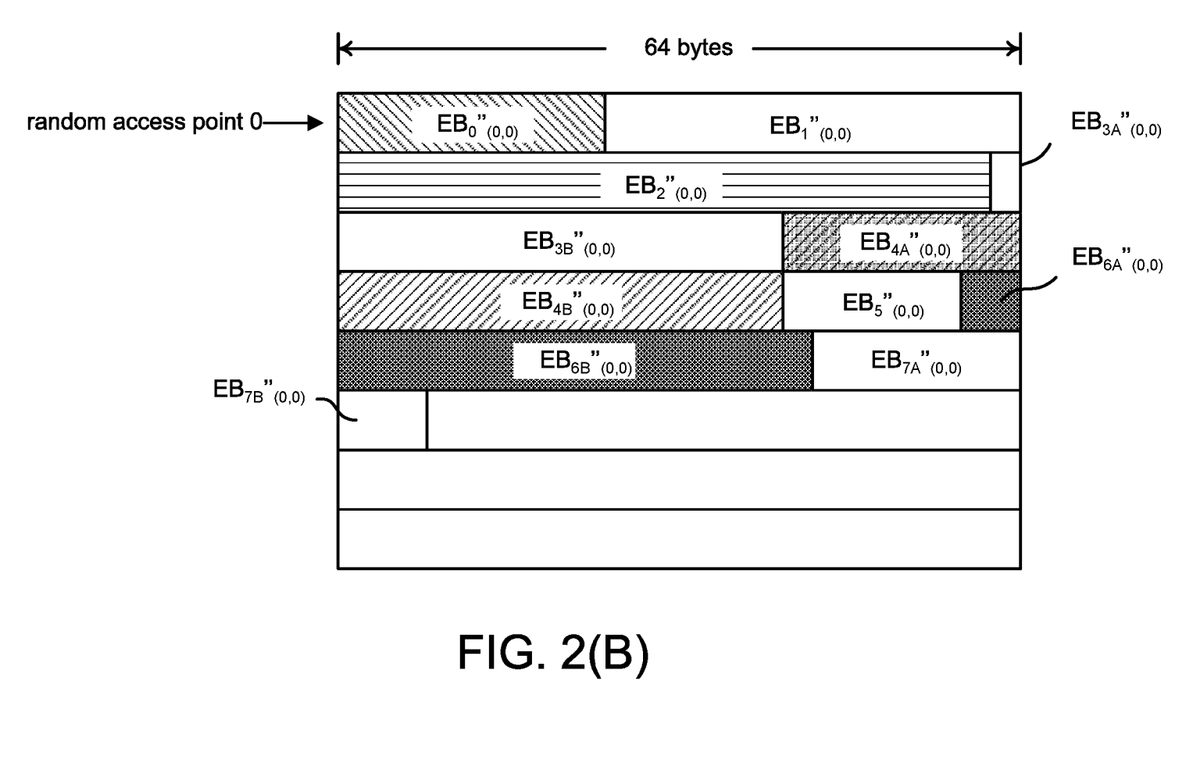
FIG. 2(B) shows a planning method of a storage space in a frame buffer coordinating with data compression.

FIG. 2(B) shows a spatial configuration of a storage space in a frame buffer coordinating with data compression. In this example, eight sets of compressed data (denoted as $[EB_0 \sim EB_7]''_{(0,\ 0)}$ corresponding to eight coding blocks of the image block (0, 0) have different sizes. As shown in FIG. 2(B), starting from the random access point 0, the eight sets of compressed data $[EB_0 \sim EB_7]''_{(0,\ 0)}$ are successively and seamlessly stored in the frame buffer. In this example, a total data amount of the compressed data $EB_0''_{(0,\ 0)}$ and the compressed data $EB_1''_{(0,\ 0)}$ is 64 bits, and thus together occupy the memory space of the $1^{st}$ row having a length of 64 bytes counting from the random access point 0. The data amount of the compressed data $EB_2''_{(0,\ 0)}$ is smaller than 64 bits, and so a part of the compressed data $EB_3''_{(0,\ 0)}$ (denoted as $EB_{3A}''_{(0,\ 0)}$) and the compressed data $EB_2''_{(0,\ 0)}$ together occupy the memory space of the $2^{nd}$ row having a length of 64 bytes. Similarly, the other part of compressed data $EB_3''_{(0,\ 0)}$ (denoted as $EB_{3B}''_{(0,\ 0)}$) and a part of compressed data $EB_4''_{(0,\ 0)}$ (denoted as $EB_{4A}''_{(0,\ 0)}$) together occupy the memory space of the $3^{rd}$ row having a length of 64 bytes, and so forth. In the example in FIG. 2(B), starting from the random access point 0, the compressed data $[EB_0 \sim EB_7]''_{(0,\ 0)}$ occupies a total memory space of 6 rows. Please note, only a part of the $6^{th}$ row instead of the entire $6^{th}$ row is used).

As generally known to one person skilled in the art, the data amount accessed each time from a frame buffer is a constant value, e.g., 32 bytes or 64 bytes. Assume that the data amount to be accessed each time from the frame buffer is 32 bytes (corresponding to the memory space of a half of a row). It is seen by comparing FIG. 2(A) with FIG. 2(B) that, to read the data associated with the coding blocks 0 to 7, a total of 512 bytes (8 rows) of data needs to be read from the coding blocks in FIG. 2(A); whereas, in FIG. 2(B), starting from the random access point 0, only 352 bytes (5.5 rows) of data needs to be read from the frame buffer encoded coding blocks. It is apparent that the frame buffer encoded coding blocks in FIG. 2(B) achieve an effect of reducing the data transmission amount. However, one drawback of the approach in FIG. 2(B) is that, when only the compressed data $[EB_6 \sim EB_7]''_{(0,\ 0)}$ needs to be read, as only one random access point 0 is present at the starting position (e.g., the starting position of the compressed data $EB_0''_{(0,\ 0)}$) of the frame buffer, all of the compressed data $[EB_0 \sim EB_5]''_{(0,\ 0)}$ also needs to be read before the compressed data $[EB_6 \sim EB_7]''_{(0,\ 0)}$ is read. As a result, quite the contrary, the access efficiency may be degraded and the access bandwidth may be wasted.

According to another embodiment of the present invention, the coding blocks included in an image block are categorized. More specifically, each image block includes a plurality of first-type coding blocks and at least one second-type coding block. The categorization of the coding blocks is based on following factor—to perform image processing on a part of an image block (referred to as a target image block), a part of another image block (to be referred to as a reference image block) needs to be read as reference for the above image processing. Accordingly, the part of the target image block is regarded as the first-type coding block, and the part of the reference image block is regarded as the second-type coding block. When it is desired to access the second-type coding block of the reference image block but not the first-type coding block of the reference image block, the second-type coding block can be independently read from the frame buffer 31. Taking the image coding standard H.264 and the division configuration of coding blocks in FIG. 1(B) for example, the coding blocks 0 to 5 in each image block may be regarded as first-type coding blocks, whereas the coding blocks 6 and 7 may be regarded as second-type coding blocks. Referring to FIG. 3(A), in the image processing system 300 according to an embodiment of the present invention, for each image block being processed, the frame buffer 31 includes a first buffer region corresponding to the first-type coding blocks and a second buffer region corresponding to the second-type coding blocks. The first buffer region includes at least one first random access point, and the second buffer region includes at least one second random access point. By configurations of these different random access points, in a situation where the second-type coding block can be independently read from the image buffer 31 while the first-type coding block for the one same image block is not read. That is to say, the first-type coding block need not be read before the second-type coding block is read. Examples of configurations of the first random access points and the second random access points are given with reference to FIG. 4(A) to FIG. 4(B).

As shown in FIG. 3(A), in the image processing system 300, the image decoding module 33 performs image decoding on input data I to obtain information of the coding blocks (e.g., grayscale values, luminance values and chrominance values of pixels). The relative position of each coding block in the corresponding image block is known in advance. Thus, the image decoding module 33 may determine whether each coding block is a first-type coding block or a second-type coding block. Image decoding module 33 would transmit different types (first type or second type) of coding blocks via different signal paths. More specifically, for the same image block, the image decoding module 33 provides the first-type coding block to the image processing module 34, and stores the second-type coding block to the frame buffer 31 through the control of the frame buffer controller 32. The frame buffer controller 32 receives access requests from different modules to access the frame buffer 31, coordinates the access right of data input/output ports of the frame buffer 31, and provides the access starting address, corresponding to the numbering of the image blocks, to the requesting module. For example, after receiving a request from the image decoding module 33 asking to store the second-type coding block of an image block to the frame buffer 31, the frame buffer controller 32 provides the starting address corresponding to the second-type coding block of the image block to the image decoding module 33, to cause one or multiple second-type coding blocks to be stored to the space corresponding to the image block of the second buffer region in the frame buffer 31. After receiving the first-type coding blocks provided by the image decoding module 33, the image processing module 34 performs image processing on the first-type coding blocks to generate a group of first image processed results. For example, the image processing performed by the image processing module 34 may be a deblocking process. Next, the frame buffer encoding module 35 performs frame buffer encoding on the group of first image processed results to generate a group of first frame buffer encoded results. Then, with the controlling of the frame buffer controller 32, the frame buffer encoding module 35 stores the group of first frame buffer encoded results to the first buffer region corresponding to the image block to which the first-type coding blocks belong, in the frame buffer 31.

Taking the image processing system 300 processing the image block (1, 0) in FIG. 1(A) for example, FIG. 3(A) depicts signal contents transmitted among the modules. Assuming that the coding blocks 0 to 5 in each image block are first-type coding blocks, and the coding blocks 6 and 7 are second-type coding blocks. Further, as previously stated, it is assumed that the image processing module 34 needs to refer to a second-type coding block of a reference image block before performing image processing on a first-type coding block of a target image block. As shown in FIG. 3(A), after having decoded the image block (1, 0), the image decoding module 33 transmits the first-type coding blocks $[EB_1 \sim EB_5]_{(1,\ 0)}$ to the image processing module 34, and transmits the second-type coding blocks $[EB_6 \sim EB_7]_{(1,\ 0)}$ to the frame buffer 31. If the image block (0, 0) is a reference image block of the image block (1, 0) and two second-type coding blocks $[EB_6 \sim EB_7]_{(0,\ 0)}$ have been stored to the frame buffer 31 earlier by the image decoding module 33, the image processing module 34 may send a request to the frame buffer controller 32 to ask to read the second-type coding blocks $[EB_6 \sim EB_7]_{(0,\ 0)}$ from the second buffer region corresponding to the image block (0, 0). Next, the image processing module 34 and the frame buffer encoding module 35 accordingly sequentially generate a group of first image processed results $[EB_0 \sim EB_5]'_{(1,\ 0)}$ and a group of frame buffer encoded results $[EB_0 \sim EB_5]''_{(1,\ 0)}$ corresponding to the image block (1, 0). The group of first frame buffer encoded results $[EB_0 \sim EB_5]''_{(1,\ 0)}$ are then stored to the first buffer region in the frame buffer corresponding to the image block (1, 0).

Figure 3B:
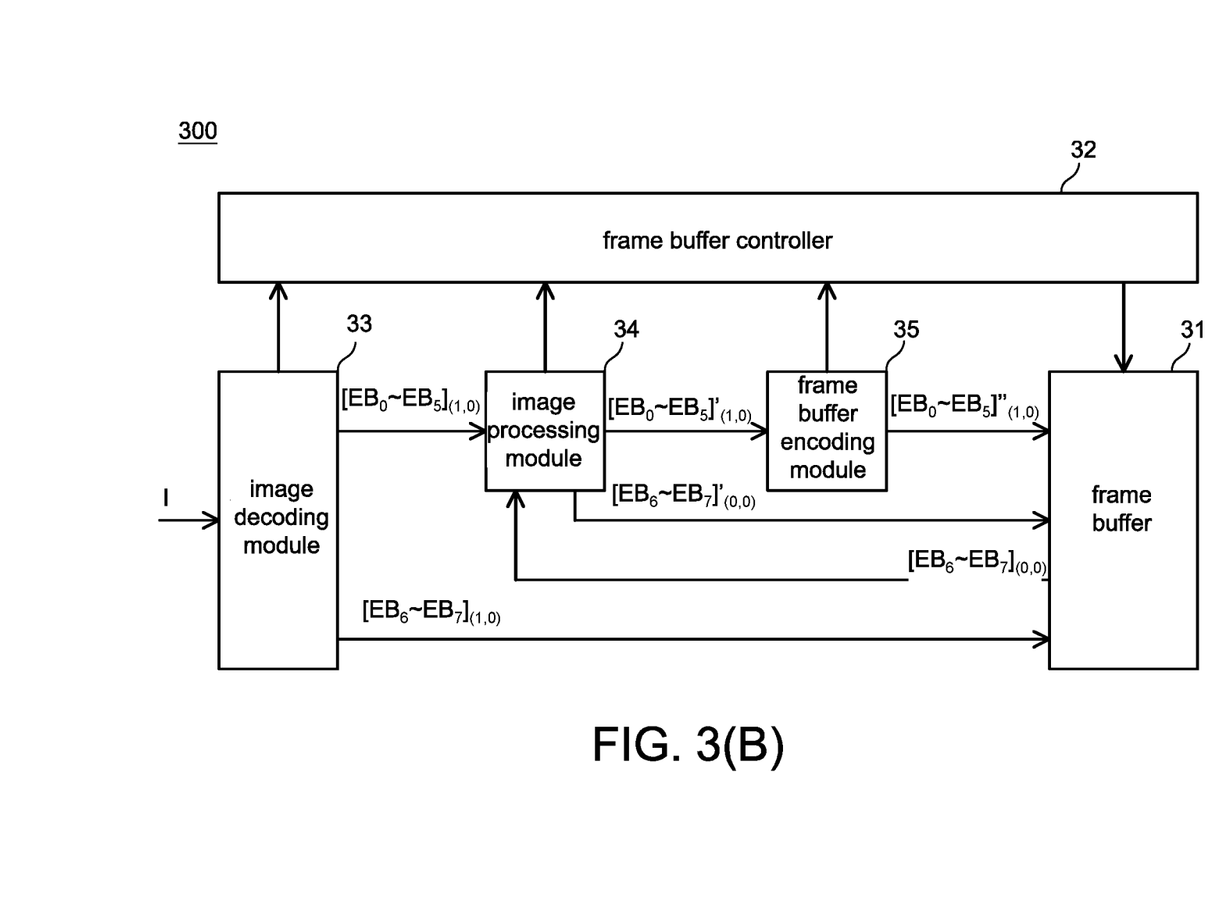
Figure 3C:
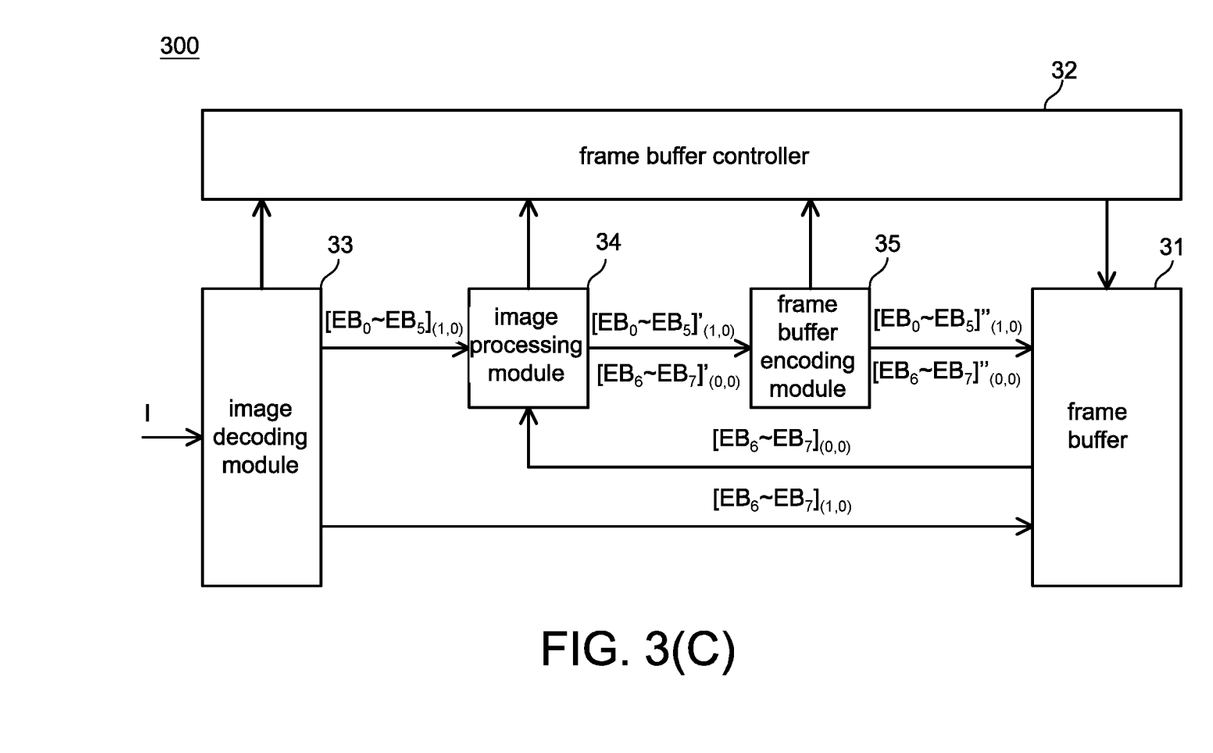

In one embodiment, when performing image processing on the first-type coding blocks $[EB_1 \sim EB_5]_{(1,\ 0)}$ of the image block (1, 0), the image processing module 34 further performs image processing on the second-type coding blocks $[EB_6 \sim EB_7]_{(0,\ 0)}$ of the image block (0, 0) to generate a group of second image processed results $[EB_6 \sim EB_7]'_{(0,\ 0)}$. For instance, when the function of the image processing module 34 includes deblocking, the image processing module 34 may modify the second-type coding blocks $[EB_6 \sim EB_7]_{(0,\ 0)}$ of the image block (0, 0) by referencing the first-type coding blocks $[EB_0 \sim EB_5]_{(0,\ 0)}$ of the reference image block (1, 0) and the second-type coding blocks $[EB_6 \sim EB_7]_{(0,\ 0)}$ of the image block (0, 0) together. In the above situation, the second image processed results $[EB_6 \sim EB_7]'_{(0,\ 0)}$ are the deblocked second-type coding blocks $[EB_6 \sim EB_7]_{(0,\ 0)}$. As shown in FIG. 3(B), the group of second image processed results $[EB_6 \sim EB_7]'_{(0,\ 0)}$ are stored back to the second buffer region in the frame buffer 31 corresponding to the image block (0, 0). Alternatively, as shown in FIG. 3(C), the group of second image processed results $[EB_6 \sim EB_7]'_{(0,\ 0)}$ are encoded by the frame buffer encoding module 35 to generate a group of second frame buffer encoded results $[EB_6 \sim EB_7]''_{(0,\ 0)}$. Then, the frame buffer encoding module 35 sends a request to the frame buffer controller 32, to cause the second frame buffer encoded results $[EB_6 \sim EB_7]''_{(0,\ 0)}$ to be stored back to the space corresponding to the image block (0, 0) of the second buffer region in the frame buffer 31. It should be noted that, details of frame buffer encoding of image data are generally known to one person skilled in the art, and shall be omitted herein.

As previously described, the first-type coding blocks having undergone image processing is compressed by the frame buffer encoding module 35 before being stored to the frame buffer 31, and the second-type coding blocks having undergone image processing may also be compressed by the frame buffer encoding module 35 before being stored to the frame buffer 31, as shown in FIG. 3(C). FIG. 4(A) to FIG. 4(D), taking eight coding blocks 0 to 7 of the image block (1, 0) for example, depicts several examples of the relationship of random access points with the first buffer region and the second buffer region in the frame buffer 31. In the four exemplary diagrams, the first buffer region for storing first-type coding blocks is denoted as 410, and the second buffer region for storing second-type coding blocks is denoted as 420. In practice, the amount of the first-type coding blocks and the second-type coding blocks are pre-known, and so the capacities of the first buffer region 410 and the second buffer region 420 may be set accordingly. Taking the High Efficiency Video Coding (HEVC) specification and the division configuration of coding blocks in FIG. 1(B) for example, if the length and width of each image block is 32 pixels*16 pixels, the data amount of each of the eight coding blocks 0 to 7 before compression is 64 bytes. In the situation when lossless compression is adopted, the first buffer region 410 may be designed as six memory spaces each having a length of 64 bytes, and the second buffer region 420 may be designed as two memory spaces each having a length of 64 bytes. Thus, it is ensured that the total capacity of the first buffer region 410 and the second buffer region 420 is sufficient for accommodating complete data of one image block.

Figure 4A:
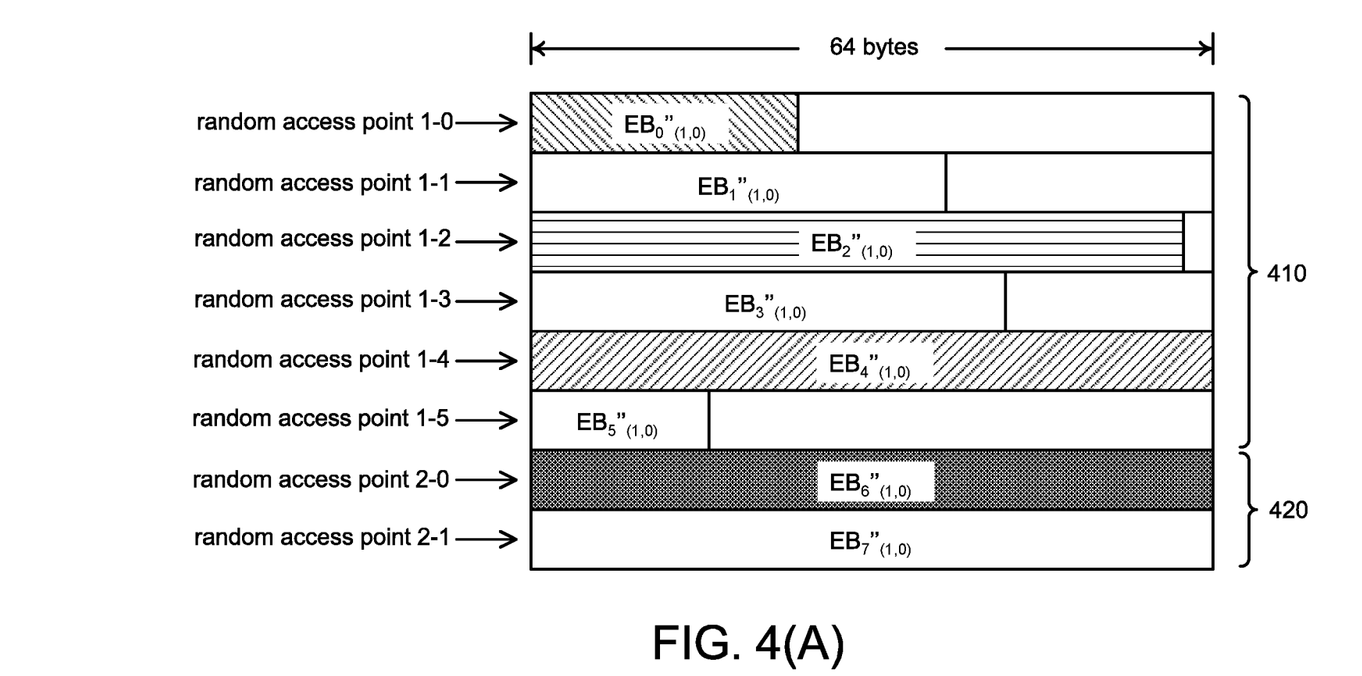
FIG. 4(A) to FIG. 4(D), taking eight coding blocks of an image block as an example, shows several examples of relationships of random access points with a first buffer region and a second buffer region in a frame buffer of the present invention.

Referring to the example in FIG. 4(A), the first buffer region 410 includes eight memory spaces each having a length of 64 bytes. The group of first frame buffer encoded results $[EB_5 \sim EB_5]''_{(1, 0)}$ are stored to the first buffer region 410. Seen from FIG. 4(A), the five frame buffer encoded results $[EB_5 \sim EB_5]''_{(1, 0)}$ correspond to respective coding blocks, and are respectively assigned with first random access points (1-1, 1-1, ... and 1-5) by the frame buffer controller 32. The two second-type coding blocks $[EB_6 \sim EB_7]_{(1, 0)}$ provided by the image decoding module 33 are stored to the second buffer region 420, and are respectively assigned with second random access points (2-1, and 2-1). In the above situation, the modules in the image processing system 300 may request the frame buffer controller 32 so that the modules can directly and solely access any set of the eight sets of data including the frame buffer encoded results $[EB_5 \sim EB_5]''_{(1, 0)}$ and the coding blocks $[EB_6 \sim EB_7]_{(1, 0)}$.

Figure 4B:
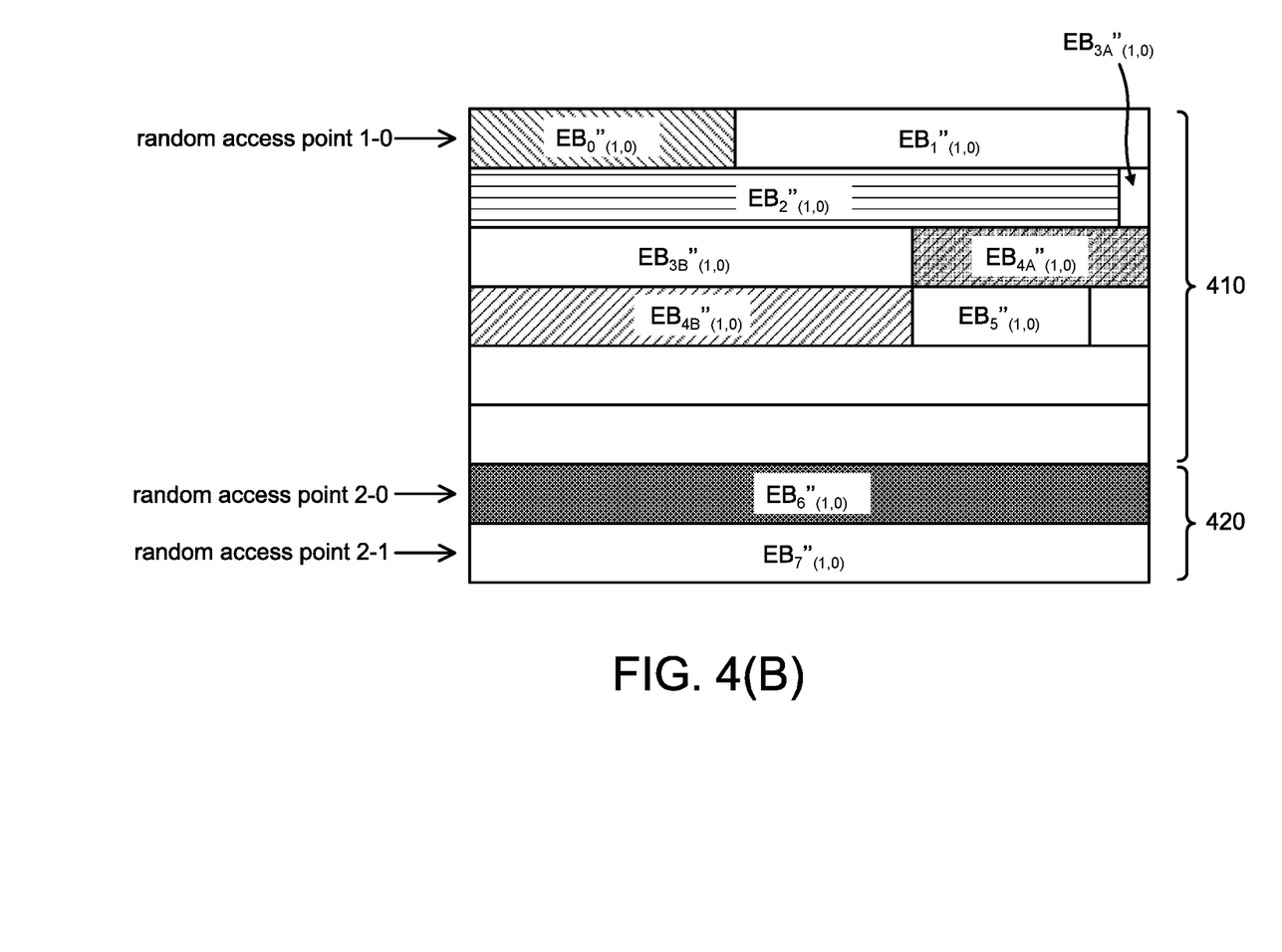

Referring to the example in FIG. 4(B), the group of first frame buffer encoded results $[EB_5 \sim EB_5]''_{(1, 0)}$ provided by the frame buffer encoding module 35 are successively and seamlessly stored in the first buffer region 410, and includes a first random access point (1-1). That is to say, the memory space closely following the frame buffer encoded result $EB_0''_{(1, 0)}$ is used for storing the frame buffer encoded result $EB_1''_{(1, 0)}$, and so forth. When the memory space of a certain row is full, the frame buffer controller 32 then stores data to the memory space of the next row in the first buffer region 410. As shown in FIG. 4(B), the memory space of the $1^{st}$ row in the first buffer region 410 simultaneously stores the frame buffer encoded results $EB_0''_{(1, 0)}$ and the frame buffer encoded result $EB_1''_{(1, 0)}$, and the memory space of the $2^{nd}$ row of the first buffer region 410 simultaneously stores the frame buffer encoded result $EB_2''_{(1, 0)}$ and a part of the frame buffer encoded result $EB_3''_0$, (denoted as $EB_{3A}''_{(1, 0)}$). In this example, the group of first frame buffer encoded results $[EB_5 \sim EB_5]''_{(1, 0)}$ occupy the memory spaces of the $1^{st}$ to $4^{th}$ rows in the first buffer region 410 (with a part of instead of the entire $4^{th}$ row being used). On the other hand, the two coding blocks $[EB_6 \sim EB_7]_{(1, 0)}$ are stored in a memory space of one row in the second buffer region 420, and are respectively assigned with second random access point (2-0 and 2-1) by the frame buffer controller 32. A benefit of the above approach is that, any of the coding blocks $[EB_6 \sim EB_7]_{(1, 0)}$ may be independently accessed.

Figure 4C:
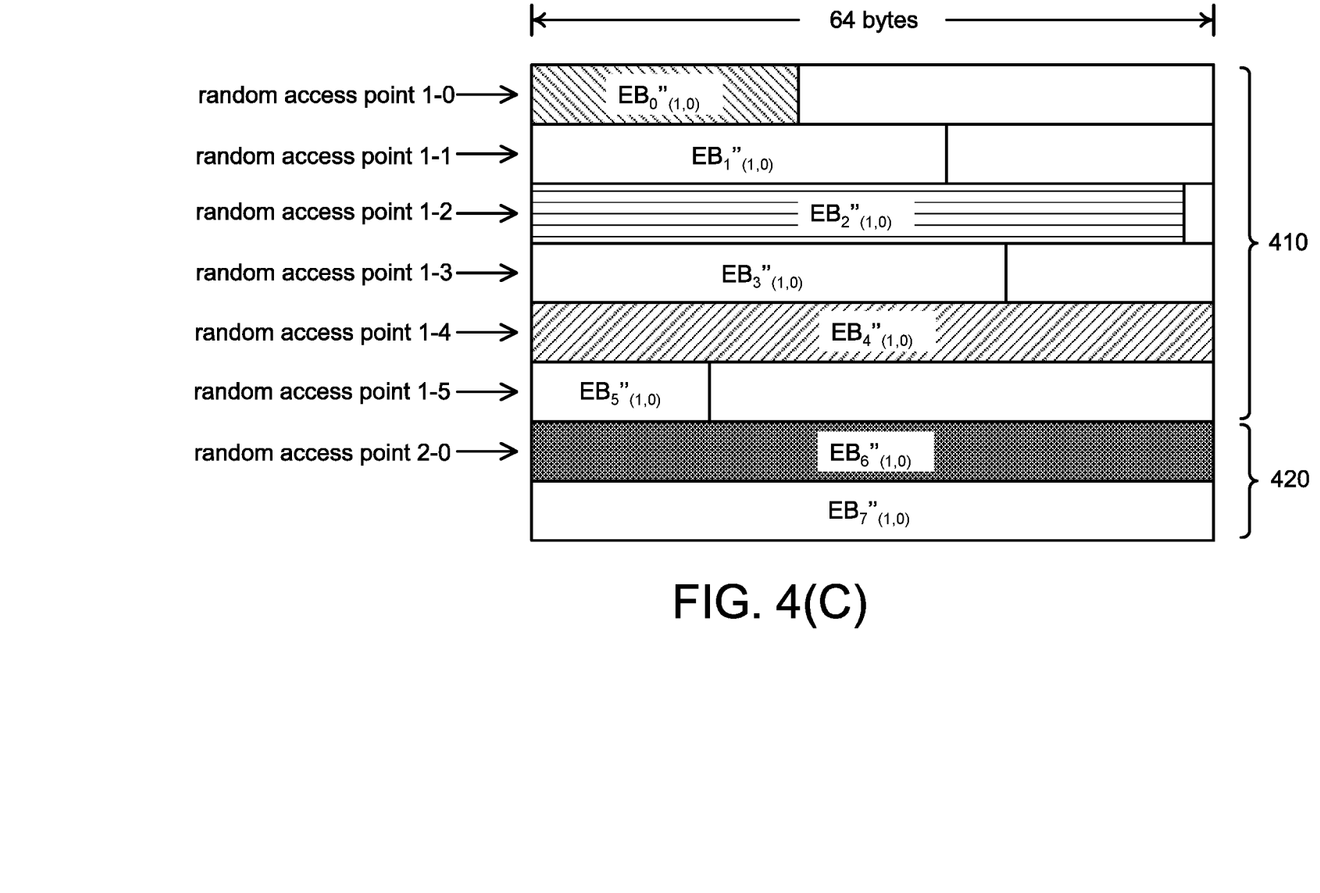

Referring to the example in FIG. 4(C), the group of first frame buffer encoded results $[EB_5 \sim EB_5]''_{(1, 0)}$ provided by the frame buffer encoding module 35 are divided into five portions, which are stored to the first buffer region 410 and are respectively assigned with first random access points (1-0, 1-1, ... and 1-5) by the frame buffer controller 32. On the other hand, the two second-type coding blocks $[EB_6 \sim EB_7]_{(1, 0)}$ that are not frame buffer encoded are successively and seamlessly stored in the second buffer region 420 and share one second random access point (2-0).

Figure 4D:
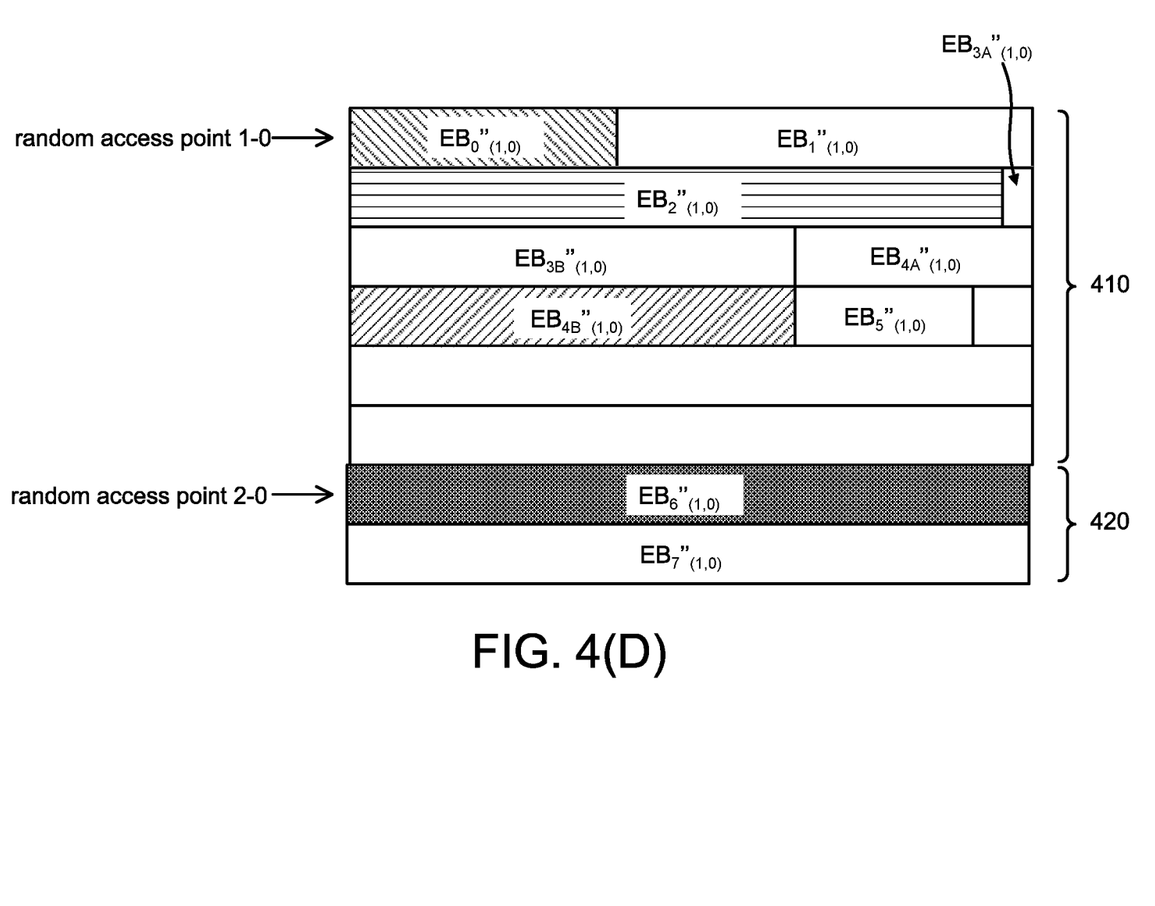

Referring to the example in FIG. 4(D), the group of first frame buffer encoded results $[EB_5 \sim EB_5]''_{(1, 0)}$ provided by the frame buffer encoding module 35 are successively and seamlessly stored in the first buffer region 410, and share one random access point (1-0). Similarly, the two second-type coding blocks $[EB_6 \sim EB_7]_{(1, 0)}$ that are not frame buffer encoded are successively and seamlessly stored in the second buffer region 420 and share one second random access point (2-0). In practice, the frame buffer encoding module 35 may record whether each coding block has undergone frame buffer encoding and the data amount of each frame buffer encoded result, and store the information in the frame buffer 31 or another buffer. In other words, the data amount in the frame buffer 31 corresponding to each coding block is known. Assume that the data amount that the frame buffer controller 32 reads each time from the frame buffer 31 is a fixed value of 32 bytes (corresponding to the memory space of half a row in the drawing). In the example in FIG. 4(D), to read the image block (1, 0) from the frame buffer 31, the frame buffer controller 32 may estimate that the frame buffer encoded results $[EB_5 \sim EB_5]''_{(1, 0)}$ occupy the memory spaces of the $1^{st}$ to $4^{th}$ rows in the first buffer region 410 according to the respective data amounts of the frame buffer encoded results $[EB_5 \sim EB_5]''_{(1, 0)}$, with more than a half of the memory space of the $4^{th}$ row being used. On the other hand, the coding blocks $[EB_6 \sim EB_7]_{(1, 0)}$ that are not frame buffer encoded occupy the memory spaces of the $1^{st}$ and $2^{nd}$ rows in the second buffer region 420. Thus, the frame buffer controller 32 should consecutively read 32 bytes for eight times from the first random accesses point 1-0 (reading a total of 256 bytes of data) to read the frame buffer encoded results $[EB_5 \sim EB_5]''_{(1, 0)}$. The frame buffer controller 32 then consecutively reads 32 bytes for four times from the second random access point 2-0 (reading a total of 96 bytes) to completely read the coding blocks $[EB_6 \sim EB_7]_{(1, 0)}$. On the other hand, when reading the coding blocks $[EB_6 \sim EB_7]_{(1, 0)}$ from the frame buffer 31, the frame buffer controller 32 may directly consecutively read 32 bytes for four times from the second random access point 2-0 (reading a total of 96 bytes of data).

It should be noted that, handing the second-type coding blocks in the second buffer region 420 to the image processing module 34 to serve as reference data is only one possibility of using the second-type coding blocks. The second-type coding blocks may also be used by other modules in the image processing system 300.

Figure 5:
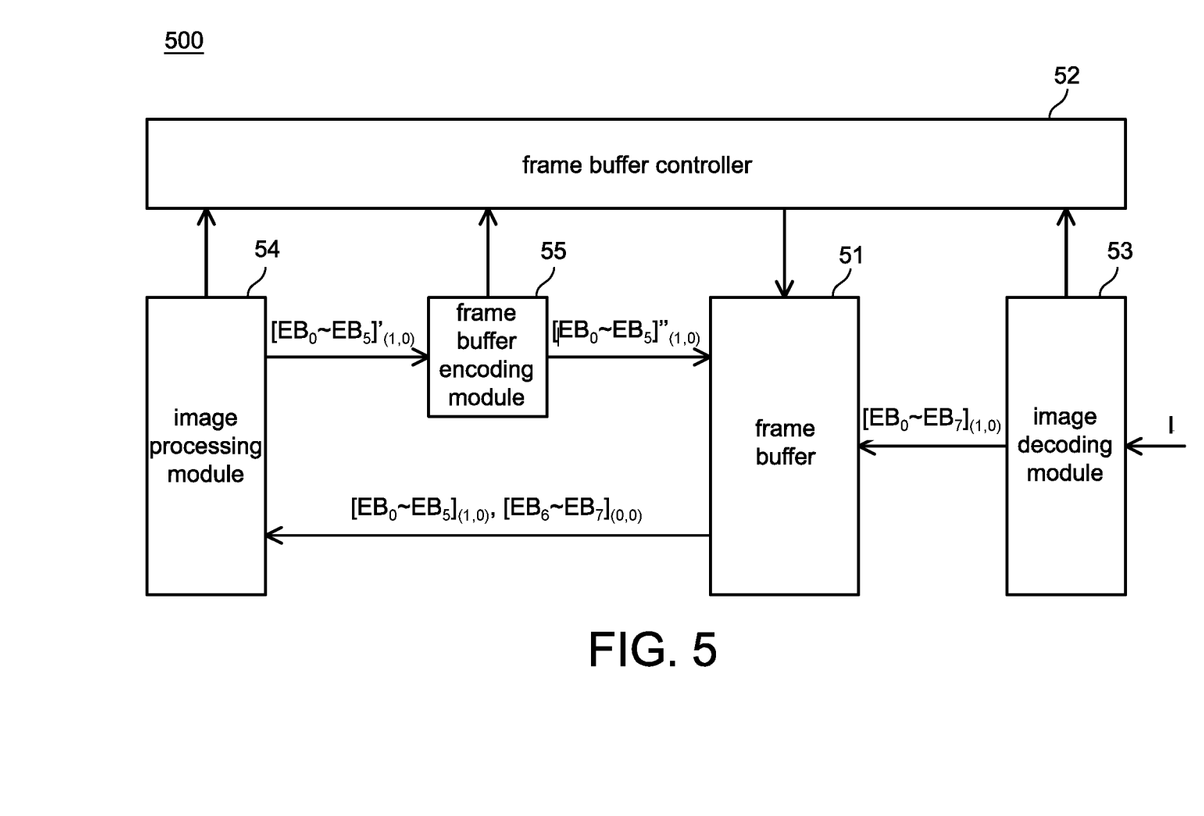
FIG. 5 is a function block diagram of an image processing system according to another embodiment of the present invention.

FIG. 5 shows a function block diagram of an image processing system 500 according to another embodiment of the present invention. One main difference between the image processing system 500 and the image processing system 300 in FIG. 3(A) is that, coding blocks generated by an image decoding module 53 are first stored to a frame buffer 51. Only when an image processing module 54 needs data of certain coding blocks, a request is then sent to a frame buffer controller 52 to read the data from the frame buffer 51. Similarly, the first image processed results generated by the image processing module 54 are sent to a frame buffer encoding module 55 and are compressed, and then stored to the frame buffer 51. Identical to the frame buffer 31, for each image block being processed, the frame buffer 51 also includes a first buffer region corresponding to first-type coding blocks and a second buffer region corresponding to second-type coding blocks. The first buffer region includes at least one first random access point, and the second buffer region includes at least one second random access point. Thus, even when the first-type coding blocks corresponding to the same image block are not read, the second-type coding blocks may still be independently read from the frame buffer 51.

One person skilled in the art can understand that, the scope of the present invention is not limited to the number of blocks, data amounts, categorization method of blocks and memory space configurations in the above examples.

Figure 6:
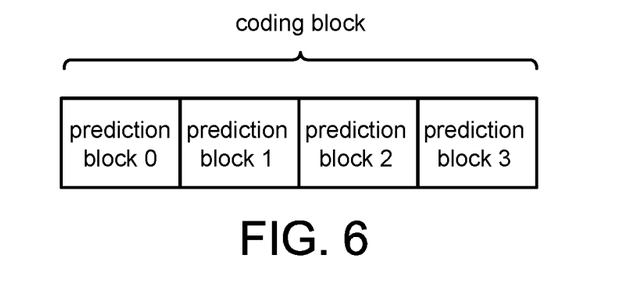
FIG. 6 is a schematic diagram of dividing a coding block into multiple prediction blocks.

In practice, each coding block may be further divided to include a plurality of prediction blocks, as shown in FIG. 6. In the example in FIG. 6, one coding block includes four prediction blocks. For example, assuming that the length and width of each image block, serving as a fundamental unit for dynamic image decoding, are 32 pixels*16 pixels, the length and width of each coding block may be 16 pixels*4 pixels, and the length and width of each prediction block may be 4 pixels*4 pixels. The prediction block may be set as a smallest compression/decompression unit block. That is to say, each prediction block of the plurality of prediction blocks has corresponding compression information, e.g., a bit length after compression.

It should be noted that, if the coding blocks are compressed by frame buffer encoding before being stored to the frame buffers 31 and 51, the coding blocks may be first decompressed by a frame buffer decoding module (not shown) after being fetched and before being used. In one embodiment, the frame buffer coding modules 35 and 55 selectively perform frame buffer encoding on the image processed results outputted from the image processing modules 34 and 54, and determine whether to compress an image processed result according to a compression efficiency threshold. For example, assuming that the compression efficiency threshold is 70%, the frame buffer encoding module 35, before compressing an image processed result, may first evaluate whether the data amount after compression is lower than 70% of the data amount before compression. If not, the frame buffer encoding module 35 does not compress the image processed result. One benefit of such approach is that, electric power and time needed for performing frame buffer encoding/frame buffer decoding on image processed results with unsatisfactory compression efficiency can be saved.

Figure 7:
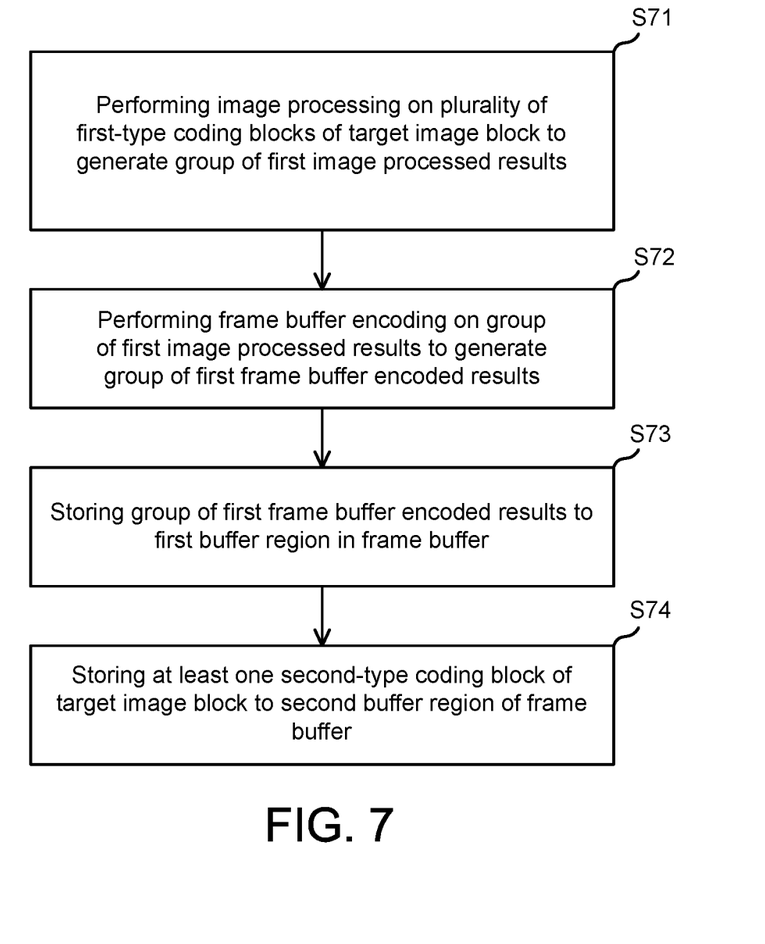
FIG. 7 is a flowchart of an image processing method according to an embodiment of the present invention.

An image processing method, coordinating with a frame buffer to perform image processing on multiple image blocks, is further provided according to another embodiment of the present invention. FIG. 7 shows a flowchart of the image processing method. Each of the multiple image blocks includes a plurality of first-type coding blocks and at least one second-type coding block. The frame buffer includes a first buffer region and a second buffer region corresponding to a target image block. The first buffer region includes at least one first random access point. The second buffer region includes at least one second random access point, which is independent from the at least one first random access point. In step S71, image processing is performed on the plurality of first-type coding blocks in the target image block to generate a group of first image processed results. In step S72, frame buffer encoding is performed on the group of first image processed results to generate a group of first frame buffer encoded results. In step S73, the group of first frame buffer encoded results are stored to the first buffer region in the frame buffer. In step S74, the at least one second-type coding block in the target image block is stored to the second buffer region in the frame buffer. It should be noted that, step S74 may independent exist from steps S71 to S3; that is, the time for performing step S74 is not limited to the time for performing steps S71 to S73.

One person skilled in the art can understand that, various possible modifications and variations in the description associated with the image processing systems 300 and 500 are applicable to the image processing method in FIG. 7, and shall be omitted herein. For example but not limited to, the concept of the present invention is applicable to H.264 and HEVC audiovisual compression encoding technologies.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An image processing system, performing image processing on a plurality of image blocks, each of the plurality of image blocks comprising a plurality of first-type coding blocks and at least one second-type coding block, the image processing system comprising:

an image processor, performing image processing on a plurality of first-type coding blocks of a target image block to generate a group of first image processed results;

a frame buffer encoder, performing frame buffer encoding on the group of first image processed results to generate a group of first frame buffer encoded results;

a frame buffer, corresponding to the target image block, providing a first buffer region and a second buffer region, the first buffer region comprising at least one random access point, the second buffer region comprising at least one second random access point independent from the first random access point; and a frame buffer controller, controlling the group of first frame buffer encoded results to be stored in the first buffer region of the frame buffer, and controlling at least one second-type coding block in the target image block to be stored to the second buffer region, wherein the frame buffer is configured with a first reference buffer region and a second reference buffer region corresponding to a reference image block adjacent to the target image block, the first reference buffer region comprises at least one first random access point, the second reference buffer region comprises at least one second random access point independent from the at least one first random access point; the frame buffer controller reads at least one second-type coding block of the reference image block frame from the at least one second random access point of the second reference buffer region from the frame buffer, and provides the at least one second-type coding block for reference of the image processor when the image processor performs image processing on the plurality of first-type coding blocks of the target image block.

2. The image processing system according to claim 1, wherein the frame buffer controller controls the group of first frame buffer encoded results to be successively and seamlessly stored in the first buffer region from one of the at least one first random access point.

3. The image processing system according to claim 1, wherein the group of first frame buffer encoded results comprises a plurality of frame buffer encoded results, the first buffer region comprises a plurality of first random access points; the frame buffer controller controls the plurality of frame buffer encoded results to be respectively stored to the first buffer region from different first random access points.

4. The image processing system according to claim 1, wherein the frame buffer controller controls the at least one second-type coding block of the target image block to be successively and seamlessly stored in the second buffer region, starting from a second random access point of the at least one second random access points.

5. The image processing system according to claim 1, wherein the target image block comprises a plurality of second-type coding blocks, the second buffer region comprises a plurality of second random access points, and the frame buffer controller controls the plurality of second-type coding blocks to be respectively stored to the second buffer region from different second random access points.

6. The image processing system according to claim 1, wherein the image processor further performs image processing on the at least one
second-type coding block of the reference image block that is read to generate a group of second image processed results, such that the group of second image processed results is associated with the group of first image processed results.

7. The image processing system according to claim 6, wherein the frame buffer encoder further performs frame buffer encoding on the group of second image processed results to generate a group of second frame buffer encoded results; the frame buffer controller controls the group of second frame buffer encoded results to be stored back to the frame buffer, from the at least one second random access point of the second reference buffer region in the frame buffer corresponding to the reference image block.

8. The image processing system according to claim 6, wherein the image processor generates the group of first image processed results and the group of second image processed results by referencing together the at least one second-type coding block of the reference image block and the plurality of first-type coding blocks of the target image block.

9. The image processing system according to claim 1, wherein the frame buffer encoder compresses the group of first image processed results according to a compression ratio threshold to obtain the group of first frame buffer encoded results.

10. An image processing method, coordinating with a frame buffer to perform image processing on a plurality of image blocks, each of the plurality of image blocks comprising a plurality of first-type coding blocks and at least one second-type coding block, the frame buffer providing a first buffer region and a second buffer region corresponding to a target image block, the first buffer region comprising at least one first random access point, the second buffer region comprising at least one second random access point independent from the first random access point, the image processing method comprising:
a) performing image processing on a plurality of first-type coding blocks of a target image block to generate a group of first image processed results;
b) performing frame buffer encoding on the group of first image processed results to generate a group of first frame buffer encoded results;
c) storing the group of first frame buffer encoded results to the first buffer region of the frame buffer; and
d) storing the at least one second-type coding block of the target image block to the second buffer region of the frame buffer,
wherein the frame buffer is configured with a first reference buffer region and a second reference buffer region corresponding to a reference image block adjacent to the target image block, the first reference buffer region comprises at least one first random access point, the second reference buffer region comprises at least one second random access point independent from the at least one first random access point; before step (a), the image processing method further comprises:
reading at least one second-type coding block of the reference image block frame from the at least one second random access point of the second reference buffer region from the frame buffer, and providing the at least one second-type coding block for reference of the image processing performed in step (a).

11. The image processing method according to claim 10, wherein step (c) comprises: storing the group of first frame buffer encoded results successively and seamlessly in the first buffer region, starting from a first random access point of the at least one first random access point.

12. The image processing method according to claim 10, wherein the group of first frame buffer encoded results comprises a plurality of frame buffer encoded results, the first buffer region comprises a plurality of first random access points; step (c) comprises: storing the plurality of frame buffer encoded results respectively in the first buffer region from different first random access points.

13. The image processing method according to claim 10, wherein step (d) comprises: storing the at least one second-type coding block of the target image block successively and seamlessly in the second buffer region, starting from a second random access point of the at least one second random access points.

14. The image processing method according to claim 10, wherein the target image block comprises a plurality of second-type coding blocks, the second buffer region comprises a plurality of second random access points; step (d) comprises: storing the plurality of second-type coding blocks respectively to the second buffer region from different second random access points.

15. The image processing method according to claim 10, further comprising:
performing image processing on the at least one second-type coding block of the reference image block read to generate a group of second image processed results, such that the group of second image processed results is associated with the group of first image processed results.

16. The image processing method according to claim 15, further comprising:
performing frame buffer encoding on the group of second image processed results to generate a group of second frame buffer encoded results; and storing the group of second frame buffer encoded results back to the frame buffer, from the at least one second random access point of the second reference buffer region in the frame buffer corresponding to the reference image block.

17. The image processing method according to claim 15, wherein step (a) comprises: generating the group of first image processed results and the group of second image processed results by referencing together the at least one second-type coding block of the reference image block and the plurality of first-type coding blocks of the target image block.

18. The image processing method according to claim 10, wherein step (b) comprises: compressing the group of first image processed results according to a compression ratio threshold to obtain the group of first frame buffer encoded results.

* * * * *